United States Patent [19]

Jeffers et al.

[11] 4,388,662
[45] Jun. 14, 1983

[54] THIN FILM MAGNETORESISTIVE HEAD

[75] Inventors: Frederick Jeffers, Escondido; Richard J. McClure, San Diego, both of Calif.

[73] Assignee: Eastman Kodak Company, Rochester, N.Y.

[21] Appl. No.: 229,039

[22] Filed: Jan. 28, 1981

[51] Int. Cl.³ ............................ G11B 5/12; G11B 5/30
[52] U.S. Cl. .................................. 360/113; 338/32 R
[58] Field of Search ............... 360/113, 122, 125, 115; 338/32 R; 324/252

[56] References Cited

U.S. PATENT DOCUMENTS

| Re. 26,610 | 6/1969 | DeKoster | 360/113 |
|---|---|---|---|
| 3,731,007 | 5/1973 | Masuda et al. | |
| 3,921,218 | 11/1975 | Kayser | |
| 3,945,038 | 3/1976 | Lazzari | |
| 3,947,889 | 3/1976 | Lazzari | |
| 4,051,542 | 9/1977 | Kanai | |
| 4,100,583 | 7/1978 | Koel et al. | 360/113 |
| 4,306,215 | 12/1981 | Jeffers | 360/113 |

Primary Examiner—John H. Wolff
Attorney, Agent, or Firm—Robert F. Cody

[57] ABSTRACT

A flux-responsive magnetic head having a transducer gap also has first and second back gaps across which, respectively, are first and second thin film magnetoresistive elements. The elements have similarly oriented magnetization vectors and, as such, the magnetoresistive elements are differentially responsive to flux entering said transducer gap. Spurious fields, however, have no differential effect on the resistances of the magnetoresistive elements. In a preferred form of the invention, an additional, similar working, pair of magnetoresistive elements is employed across the back gaps, such additional elements not only providing increased signal response, but also serving as keepers for the first pair of magnetoresistive elements.

9 Claims, 6 Drawing Figures

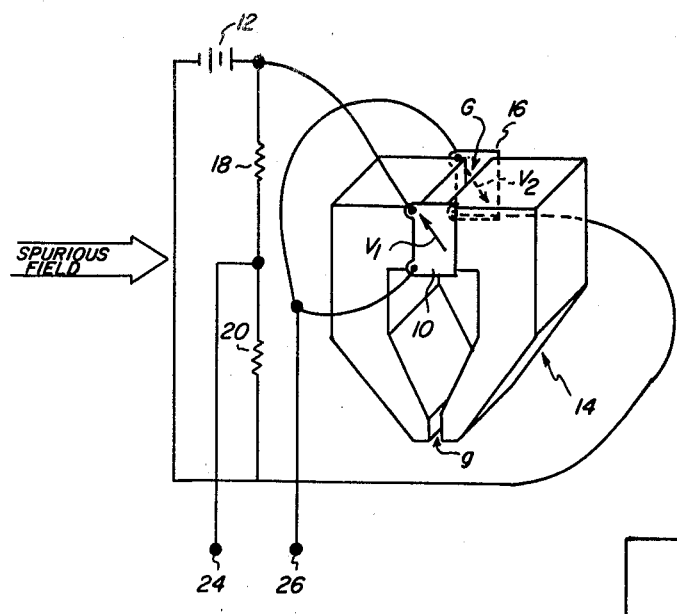
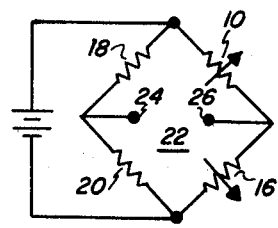
FIG. 1
PRIOR ART
FIG. 1a
PRIOR ART
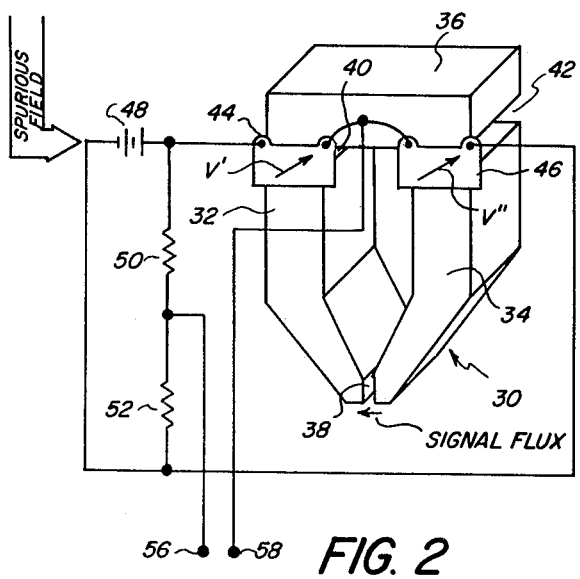
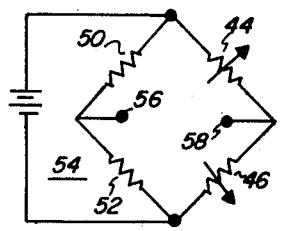
FIG. 2
FIG. 2a

THIN FILM MAGNETORESISTIVE HEAD

FIELD OF THE INVENTION

This invention relates in general to magnetic flux sensing apparatus and, in particular, to a magnetic head of the type employing a thin single domain magnetic film structure as a magnetoresistive element responsive to the flux being sensed.

Figure 3:
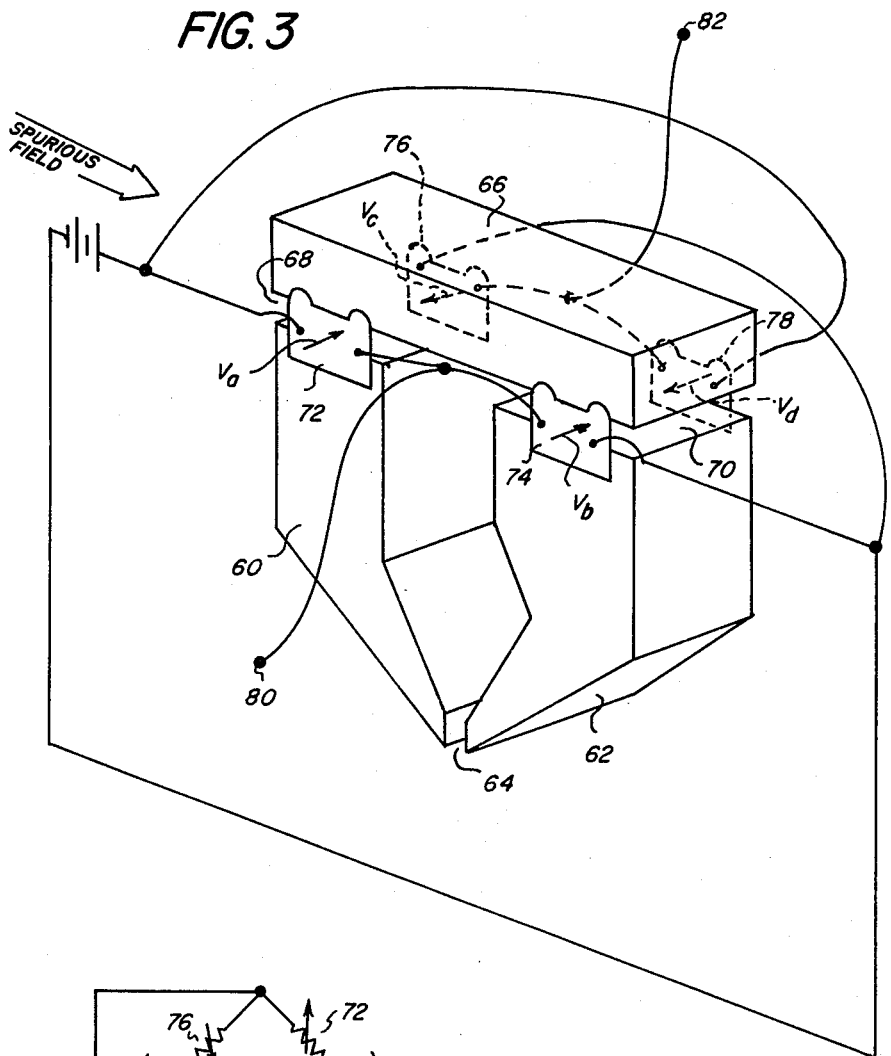
Figure 3A:
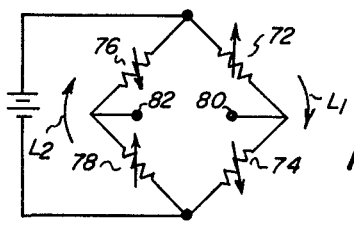

The invention, as well as the prior art, will be discussed with reference to the figures wherein:

FIG. 1 is a perspective view of a prior art magnetoresistive head over which the invention provides improvement, FIG. 1a is a schematic diagram useful in discussing the apparatus of FIG. 1, FIG. 2 is a perspective view of apparatus incorporating the invention, FIG. 2a is a schematic diagram useful in describing the apparatus of FIG. 2, FIG. 3 is a perspective view of a presently preferred embodiment of the invention, and FIG. 3a is a schematic diagram useful in describing the apparatus of FIG. 3.

BACKGROUND RELATIVE TO THE PRIOR ART

Playback of recorded signals from a magnetic recording medium by means of a conventional magnetic head that is sensitive to flux rate-of-change is difficult for low recorded signal frequencies, and theoretically impossible for recorded DC signals, or when there is no relative speed between the recording medium and the magnetic head. Accordingly, various techniques have been proposed for sensing magnetic flux, as opposed to the rate-of-change of such flux, e.g. Hall effect, flux gate, and magnetoresistive devices, thereby to permit recording media to be used as optimally as possible.

With regard to the matter of magnetoresistive devices for sensing magnetic fields, the use of a thin single domain magnetic film for field sensing purposes is known. Representative prior art depicting the use of magnetoresistive thin film structures can be found in the following references: U.S. Pat. Nos. 3,731,007; 3,947,889; 3,921,218; 3,945,038; and 4,051,542. Typically, a thin (planar) single domain magnetoresistive film is employed to sense a magnetic field to which it is exposed by passing an electrical sense current (either AC or DC) through the film, the film magnetization vector being canted with respect to both the direction of current flow and the direction of the field being sensed. The field being sensed exerts a torque on the magnetic moment in the film, causing the resistance of the film to increase or decrease depending on the sense and magnitude of the field applied to the film. The resistance of the film is, therefore, the analog of the field strength. Although such use of a magnetoresistive film represents a reasonably workable technique in the art of magnetic flux sensing, it suffers from, among other things, the standpoint of reduced sensitivity to the external field: this is because pole formation at the edges of the film in question causes the generation of a large demagnetization field which adversely affects the effectiveness of the film.

In the interest of reconciling the problem of reduced sensitivity as caused by film demagnetization, the prior art has taught the use of paired magnetoresistive devices at the back gap of a magnetic head. See the perspective showing of FIG. 1: A first thin film magnetoresistive element 10 having its magnetization vector $V_1$ canted with respect to the direction of source 12 current flow therethrough is situated at one side of the back gap G of a core 14. A second thin film magnetoresistive element 16 having its magnetization vector $V_2$ canted with respect to the current which it carries is situated at the opposite side of the core back gap G. The magnetization vectors $V_1$ and $V_2$ of the magnetoresistive elements are, however, oppositely oriented. This permits each magnetoresistive element to be a keeper for the other, whereby the tendency for demagnetization of the magnetoresistive elements is virtually eliminated. The magnetoresistive elements 10, 16 constitute respective legs of a bridge circuit which is additionally comprised of resistors 18, 20. See the bridge circuit schematic diagram 22 of FIG. 1a in which corresponding parts of the perspective and schematic views are similarly marked. When flux of a first polarity enters the transducer gap g of the core 14, the magnetization vector $V_1$ of the magnetoresistive element 10 experiences a torque in one direction and, simultaneously, the magnetization vector $V_2$ experiences a torque in the opposite direction. (Such counter moments are reflected in the dissimilar directions of the arrows associated with the resistors 10, 16 as depicted in the bridge circuit schematic diagram 22.) When flux of an opposite polarity enters the core gap g, the magnetization vectors $V_1$ and $V_2$ experience torques that are opposite to those experienced with respect to flux of the first polarity. As the magnetization vectors change orientation, the respective resistances of the magnetoresistive elements differentially change accordingly. Thus, a signal voltage, corresponding to the magnitude and sense of the flux entering the core gap g, appears across the output contacts 24, 26 of the bridge circuit.

Although the structure of FIG. 1 works well to produce electrical signals corresponding to the signal flux entering the core gap g, such a design has been found to be susceptible to spurious fields. Spurious fields are produced, typically, by alternating current machinery in the vicinity of the core 14. Assuming that no signal flux enters the core gap g . . . and assuming further that a spurious field as indicated by the appropriately marked arrow of FIG. 1 is applied to the magnetoresistive elements 10, 16 . . . note what happens: The magnetization vector $V_1$ rotates one way and the magnetization vector $V_2$ rotates in the opposite way, thereby giving rise to a false signal across the contacts 24, 26 of the bridge circuit.

SUMMARY OF THE INVENTION

It is to the desensitization of magnetoresistive-type heads to spurious signals that the invention is directed: Since the cause of false signals by spurious fields is rooted in the use of oppositely oriented magnetization vectors in paired magnetoresistive elements, the present invention provides that the magnetization vectors be similarly oriented. However, to provide requisite differential resistance variation in response to signal flux entering the transducer gap of a core, the invention further provides for the use of "paired back gaps" in such core. How and why paired back gaps will result in differential resistance variation will be discussed below.

DETAILED DISCUSSION OF THE INVENTION

Reference should now be had to the perspective view of FIG. 2. A magnetic core 30, having first and second pole parts 32, 34 and a back bar 36, has a transducer gap 38 and first and second high reluctance back gaps 40, 42. A thin film magnetoresistive element 44 is connected across the back gap 40; and a thin film magnetoresistive element 46 is connected across the back gap 42. Both magnetoresistive elements 44, 46 have magnetization vectors V', V'', respectively, which are canted with respect to current flow therethrough from a source 48 and, importantly, the magnetization vectors are similarly oriented. The magnetoresistive elements are connected into a bridge circuit additionally comprised of fixed resistors 50, 52, the schematic diagram 54 of the bridge circuit being depicted in FIG. 2a in which the elements thereof corresponding to the elements of FIG. 2 are similarly identified.

The manner in which the head structure of FIG. 2 operates is as follows: Assuming signal flux (from a recording medium, not shown) of a given polarity enters the transducer gap 38, it traverses the pole part 32, crosses the magnetoresistive element 44, then the back bar 36, then across the magnetoresistive element 46 to the pole part 34, and back to the gap 38. The signal flux, in crossing the magnetoresistive element 44, torques its moment so as to increase the cant of its magnetization vector; and, in crossing the magnetoresistive element 46, the signal flux torques its moment so as to decrease the cant of its magnetization vector. Thus, the magnetoresistances act differentially as required (and as reflected by the differently oriented arrows associated with elements 44, 46 of the schematic diagram of FIG. 2a). With the magnetoresistances acting differentially, they cause an electrical signal of a first polarity to develop across the output contacts 56, 58 of the bridge circuit, such electrical signal being the analog of the signal flux appearing at the transducer gap 38. Assuming, on the other hand, that signal flux of an opposite polarity enters the transducer gap 38, the signal flux then courses the pole part 34, then the magnetoresistive element 46, then the back bar 36, across the magnetoresistive element 44 to the pole part 32, and back to the transducer gap 38. This causes the differential action of the magnetoresistances to reverse (i.e. the cant of the magnetization vector of the magnetoresistive element 46 increases, whereas the cant of the magnetization vector of the magnetoresistive element 44 decreases), thereby reversing the polarity of the signal voltage appearing across the contacts 56, 58 of the bridge circuit.

Now, assuming that no signal flux is entering the transducer gap 38, note what happens when a spurious field, as shown, torques the similarly oriented magnetization vectors of the magnetoresistive elements 44, 46. With the cants of both vectors decreasing (or, in the case of an oppositely directed spurious field, with the cants increasing) in unison, the bridge circuit 54 remains continuously in balance, thereby not producing a false signal in response to the spurious field.

It will be appreciated that utilization of magnetoresistive elements with similarly oriented magnetization vectors as in FIG. 2 negates the desirable keeper-action provided by the prior art practice of using paired magnetoresistive elements having oppositely-canted magnetization vectors, whereby demagnetization of the magnetoresistive elements is precluded. Further, it is well known that the use of any back gap, let alone two back gaps, has an adverse effect on the operation of a head structure. That is, if a first back gap tends to cut the structure. That is, if a first back gap tends to cut the level of signal flux in a core, which it does, the use of two back gaps will undesirably double the reduction in signal flux in the core. While these two drawbacks would tend to limit the use of the invention as practiced by the structure of FIG. 2 to certain special adaptations, the invention when practiced in a presently preferred manner provides not only immunity to spurious fields but also (1) the desired keeper-action and (2) sufficient signal gain to nullify the effect of using paired back gaps. Accordingly, reference should now be had to FIG. 3 which depicts the invention in its presently preferred form:

As indicated, first and second magnetic pole parts 60, 62 define a transducer gap 64. The pole parts 60, 62 are bridged by a magnetic back bar 66 which cooperates with the pole parts to provide first and second back gaps 68, 70. The back gaps 68, 70—to one side thereof—are magnetically short circuited by thin film magnetoresistive elements 72, 74, respectively; and both magnetoresistive elements 72, 74 have similarly canted magnetization vectors $V_a$, $V_b$. To the opposite side of the back gaps 68, 70—and again magnetically short circuiting the back gaps—are thin film magnetoresistive elements 76, 78, respectively. The magnetization vectors $V_c$, $V_d$ of the magnetoresistive elements 76, 78 are similarly canted, but such cants are opposite the cants of the magnetization vectors $V_a$, $V_b$ of the magnetoresistive elements 72, 74. Thus, the magnetoresistive elements 72, 76 desirably act as keepers for each other, the flux closure path being from the element 72 to the back bar 66, thence through the element 76 and, via the pole part 60, back to the element 72. Similarly, the magnetoresistive elements 74, 78 desirably act as keepers for each other, the flux closure path being from the element 74 to the back bar 66, thence through the element 78 and, via the pole part 62 back to the magnetoresistive element 74.

Rather than employ fixed resistances to complete a bridge circuit as in FIGS. 1 (1a) and 2 (2a), the invention in its presently preferred form utilizes only the variable resistances of the magnetoresistive elements 72, 74, 76, 78 in a bridge circuit. See FIG. 3a. As will be appreciated, when in response to signal flux entering the transducer gap 64 the resistance of the magnetoresistive element 72 increases as a result of flux at the back gap 68, the resistance of the magnetoresistive element 74 decreases as that same signal flux appears at the back gap 70. This differential change in resistance is the same effect as was noted in connection with FIG. 2 elements 44, 46, and is reflected in FIG. 3a by the differently oriented arrows associated with the elements 72, 74. Similarly, the signal flux which caused the resistance of the magnetoresistive element 72 to increase also causes the resistance of the magnetoresistive element 78 to increase (note the same orientation to the element 72, 78 arrows in FIG. 3a) . . . and the signal flux which caused the resistance of the magnetoresistive element 74 to decrease also causes the resistance of the magnetoresistive element 76 to decrease (again, note the same orientation to the element 74, 76 arrows in FIG. 3a). Thus, the resistances of the magnetoresistive elements 76, 78 also change differentially. Such being the case, i.e. with the internal resistances of both bridge circuit legs $L_1$, $L_2$ differentially changing in response to signal flux, a signal voltage appearing across the output contacts 80, 82 of the bridge circuit will be double that which would occur were, say, the resistances 76, 78 to be replaced by fixed resistors. In other words, aside from providing desired keeper-action for the magnetoresistive elements (whereby they do not tend to demagnetize), the arrangement of FIG. 3 inherently compensates for the signal-reducing effect of using paired back gaps when providing immunity to spurious fields. Regarding such spurious fields, however, since there is no differential variation in response, for example, to the indicated spurious field (see FIG. 3) in either of the bridge circuit legs $L_1$ or $L_2$, (see FIG. 3a) the desired spurious field immunity is achieved.

The invention has been described in detail with particular reference to preferred embodiments thereof, but it will be understood that variations and modifications can be effected within the spirit and scope of the invention.

What is claimed is:

1. A magnetic head comprising
   (a) first and second magnetic pole parts disposed to define a transducer gap therebetween,
   (b) magnetic means positioned relative to said first and second pole parts and respectively forming therewith first and second high reluctance gaps therebetween,
   (c) a first thin film magnetoresistive element magnetically coupling said magnetic means to said first pole part at said first gap, said first magnetoresistive element having a magnetization vector that is in the plane of its thin film, and
   (d) a second thin film magnetoresistive element magnetically coupling said magnetic means to said second pole part at said second gap, said second magnetoresistive element having a magnetization vector that is in the plane of its thin film, the quiescent orientation of said second element magnetization vector being in substantially the same direction as the quiescent direction of the magnetization vector of said first element,
   whereby magnetic flux entering said transducer gap causes a differential change in the electrical resistances of said first and second magnetoresistive elements, but spurious magnetic fields to which said head is exposed causes similar changes to the resistances of said first and second magnetoresistive elements.

2. The magnetic head of claim 1 including
   (a) means for electrically connecting said first and second magnetoresistive elements in series,
   (b) means for applying a voltage across said serially connected magnetoresistive elements,
   (c) means for providing a reference voltage, and
   (d) means for comparing the voltage at said series connection with said reference voltage, the difference between said two compared voltages being proportional to the magnitude of magnetic flux entering said transducer gap.

3. Magnetic head apparatus comprising
   (a) first, second and third magnetic means forming (1) a first high reluctance transducer gap between said first and second means, (2) a first high reluctance back gap between said first and third means, and (3) a second high reluctance back gap between said second and third means,
   (b) a first thin film magnetoresistive element magnetically coupling said first and third means across said first back gap,
   (c) a second thin film magnetoresistive element magnetically coupling said second and third means across said second back gap,
   the quiescent magnetization vectors of said first and second thin film magnetoresistive elements being so similarly oriented that magnetic flux entering said transducer gap causes a differential change in the resistances of said first and second magnetoresistive elements, and spurious magnetic fields which envelop the head apparatus cause like changes to the resistances of said magnetoresistive elements.

4. The apparatus of claim 3 further comprising
   (a) first and second resistive means connected in series to define a first connection point between said resistive means,
   (b) means connecting said first and second magnetoresistive elements in series to define a second connection point between said magnetoresistive elements and
   (c) means for applying a potential across the serial connection of resistive means and across the serially connected magnetoresistive elements, the voltage between said first and second connection points corresponding to and being the analog of magnetic flux entering said transducer gap.

5. A magnetoresistive head that is substantially immune to spurious magnetic fields comprising
   (a) first and second pole parts disposed to define a transducer gap therebetween,
   (b) magnetic means disposed in relation to said pole parts and forming therewith first and second high reluctance back gaps, respectively, between said magnetic means and said first and second pole parts, each said back gap having first and second opposing sides thereof,
   (c) a first thin film magnetoresistive element magnetically coupling said first pole part to said magnetic means across said first side of said first back gap,
   (d) a second thin film magnetoresistive element magnetically coupling said second pole part to said magnetic means across said first side of said second back gap,
   the quiescent magnetization vectors of said first and second magnetoresistive elements being similarly oriented in a first direction
   (e) a third thin film magnetoresistive element magnetically coupling said first pole part to said magnetic means across said second side of said first back gap and
   (f) a fourth thin film magnetoresistive element magnetically coupling said second pole part to said magnetic means across said second side of said second back gap,
   the quiescent magnetization vectors of said third and fourth magnetoresistive elements being similarly oriented in a second direction that is substantially opposite said first direction,
   whereby (1) signal flux entering said transducer gap causes the resistances of said first and second magnetoresistive elements and the resistances of said third and fourth magnetoresistive elements to change differentially, but spurious fields applied to said head cause like changes to the resistances of said first and second magnetoresistive elements and like changes to the resistances of said third and fourth magnetoresistive elements, and (2) said first and third magnetoresistive elements act as keepers for each other, and said second and fourth magnetoresistive elements act as keepers for each other.

6. The magnetoresistive head of claim 5 wherein
(a) said first and second magnetoresistive elements are electrically connected in series at a first connection point and
(b) said third and fourth magnetoresistive elements are electrically connected in series at a second connection point.

7. The magnetoresistive head of claim 6 including
(a) means for applying, in parallel, a voltage across both said serially connected first and second magnetoresistive elements and said serially connected third and fourth magnetoresistive elements, and
(b) means for deriving the voltage that occurs across said first and second connection points, said voltage being the analog of any magnetic flux that enters said transducer gap.

8. Magnetic head apparatus that has both good output in response to signal flux and substantial immunity to spurious fields comprising
(a) first and second magnetic pole parts disposed to define a transducer gap adapted to receive magnetic signal flux,
(b) a magnetic back bar bridging said pole parts and forming therebetween first and second high reluctance back gaps, each said back gap having first and second opposing sides, and
(c) first, second, third and fourth thin film magnetoresistive elements,
the first magnetoresistive element bridging the first side of the first back gap,
the second magnetoresistive element bridging the first side of said second back gap,
the third magnetoresistive element bridging the second side of the first back gap and
the fourth magnetoresistive element bridging the second side of the second back gap,
the quiescent magnetization vectors of said first and second magnetoresistive elements being similarly oriented in a first direction, and
the quiescent magnetization vectors of said third and fourth magnetoresistive elements being similarly oriented in a second direction that is substantially opposite said first direction.

9. The apparatus of claim 8 including
(a) means electrically connecting said first and second magnetoresistive elements into a first series leg,
(b) means electrically connecting said third and fourth magnetoresistive elements into a second series leg,
(c) means for applying in parallel a voltage across both series legs, and
(d) means for producing a signal voltage corresponding to the potential difference between the series connection of said two series legs, said signal voltage corresponding substantially to said magnetic signal flux received at said transducer gap.

* * * * *